United States Patent
Adachi (10) Patent No.: US 7,541,594 B2
(45) Date of Patent: Jun. 2, 2009

(54) IMAGE SENSOR, AND IMAGING APPARATUS USING THE SAME

(75) Inventor: Susumu Adachi, Kyoto (JP)

(73) Assignee: Shimadzu Corporation, Kyoto-fu (JP)

( * ) Notice: Subject to any disclaimer, the term of this patent is extended or adjusted under 35 U.S.C. 154(b) by 287 days.

(21) Appl. No.: 11/505,387

(22) Filed: Aug. 17, 2006

(65) Prior Publication Data

US 2007/0120063 A1   May 31, 2007

(30) Foreign Application Priority Data

Nov. 30, 2005   (JP) ............................. 2005-346097

(51) Int. Cl.
*H01L 27/146* (2006.01)
(52) U.S. Cl. ................................. 250/370.09
(58) Field of Classification Search ............. 250/370.09
See application file for complete search history.

(56) References Cited

U.S. PATENT DOCUMENTS

2005/0145800 A1* 7/2005 Mochizuki ............ 250/370.09

2007/0187609 A1* 8/2007 Karim ................... 250/370.09

FOREIGN PATENT DOCUMENTS

JP   08-047491 A   2/1996
JP   2004-023750 A   1/2004

OTHER PUBLICATIONS

Wei Zhao et al., "A Flat Panel Detector for Digital Radiology Using Active Matrix Readout of Amorphous Selenium", Proc. SPIE vol. 2708, pp. 523-531, 1996.

* cited by examiner

*Primary Examiner*—David P Porta
*Assistant Examiner*—Mindy Vu
(74) *Attorney, Agent, or Firm*—Cheng Law Group PLLC (57) ABSTRACT

An FPD controller controls a flat panel X-ray detector (FPD) to perform a reading operation for reading carriers (charge information) and a reset operation for resetting and discarding the carriers, during a frame cycle from a reading point of time for reading charge information collectively from a predetermined read area (i.e. an in-field of 2,048×2,048 pixels) to a reading point of time for reading charge information collectively from a next predetermined read area. This control can reduce the influence of the preceding predetermined read area.

14 Claims, 10 Drawing Sheets

IMAGE SENSOR, AND IMAGING APPARATUS USING THE SAME

BACKGROUND OF THE INVENTION (1) Field of the Invention

This invention relates to an image sensor, and an imaging apparatus using the image sensor, for use in the medical field, industrial field, nuclear field and so on.

(2) Description of the Related Art

An imaging apparatus that obtains images based on detected light or radiation has a light or radiation detector for detecting light or radiation. Such a detector will be described, taking an X-ray detector for example. An X-ray detector has an X-ray converting layer (semiconductor layer) of the X-ray sensitive type. The X-ray converting layer converts incident X rays into carriers (charge information).

The detector detects the X rays by reading the carriers. Amorphous selenium (a-Se) film, for example, is used as the X-ray converting layer (W. Zhao, et al., "A flat panel detector for digital radiology using active matrix readout of amorphous selenium", Proc. SPIE Vol. 2708, pp. 523-531, 1996).

In a radiographic operation carried out by irradiating an object under examination with X rays, radiographic images transmitted through the object under examination are projected onto the amorphous selenium film, thereby generating carriers proportional to the densities of the images in the film. The carriers generated in the film are collected by carrier collecting electrodes in a two-dimensional arrangement. After the collection is continued for a predetermined time (called "accumulating time"), the carriers are read outside via thin-film transistors.

Such an X-ray detector has peripheral circuits such as a gate driver circuit for switching the thin film transistors on and off, and an amplifier array circuit for reading the carriers. The driver circuit applies a driving signal to the X-ray detector to drive the X-ray detector. The amplifier array circuit receives the carriers read based on a read signal relating to reading of the carriers. The X-ray detector and these circuits constitute the image sensor.

Figure 1:
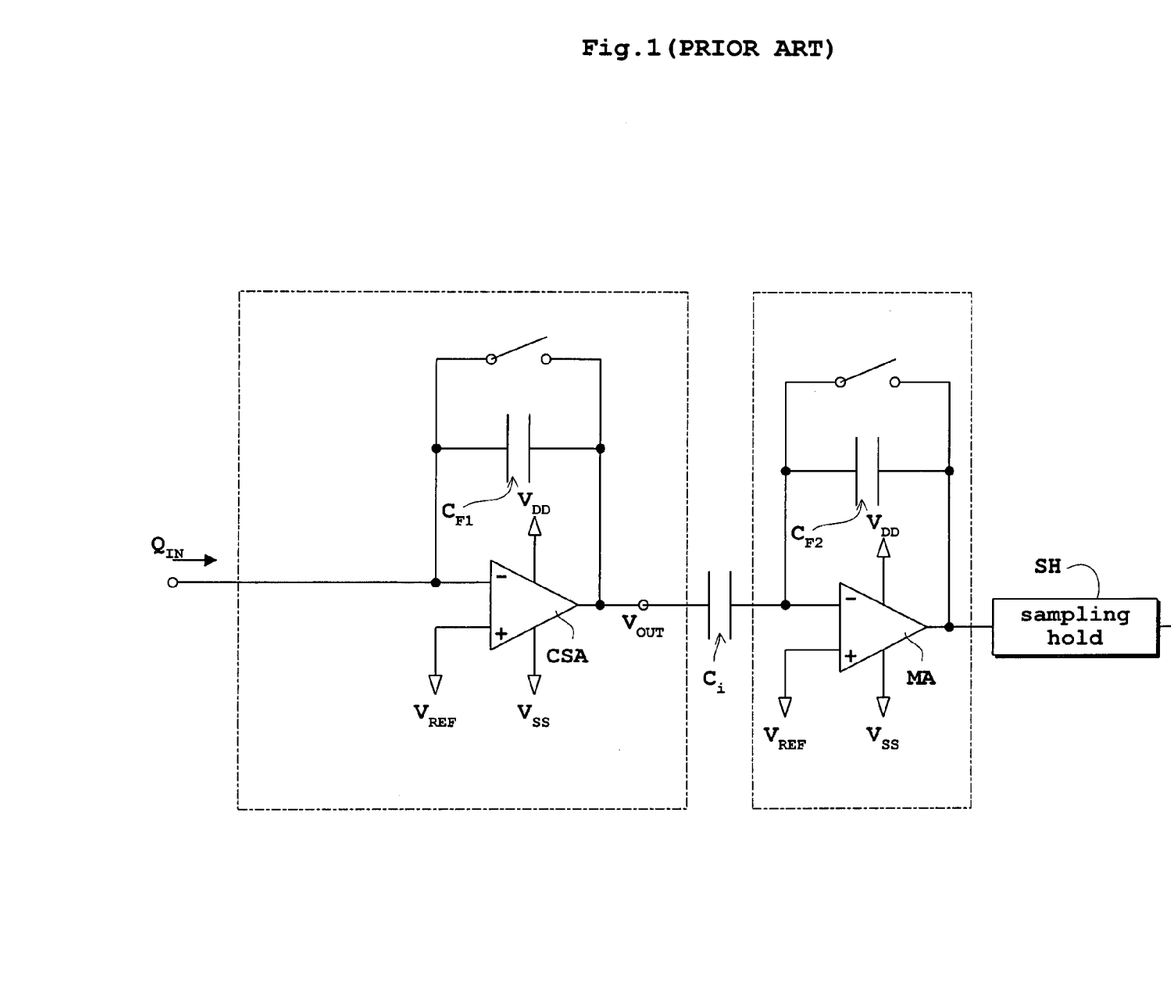
FIG. 1 is a block diagram of an amplifier array circuit in a conventional flat panel X-ray detector.

FIG. 1 shows an outline block diagram of such an amplifier array circuit. As disclosed in Japanese Unexamined Patent Publication No. 2004-23750, and as shown in FIG. 1, the amplifier array circuit includes a charge sensitive amplifier CSA at a first stage, a main amplifier MA at a second stage, and a sampling hold SH at a final stage.

As disclosed in Japanese Unexamined Patent Publication H8-47491, carriers are sometimes read selectively by limiting a predetermined read area to a part of an image field. When, for example, carriers are read from 2,048 by 2,048 pixels in the center of a total field composed of 4,096 by 4,096 pixels, the X-ray detector, gate driver circuit and amplifier array circuit are controlled accordingly.

However, the conventional construction described above encounters the following problem when carriers are read in frame cycles, such that the carriers are read from an image field for one frame, and then from an image field for a next frame, including a partial read mode for selectively reading carriers by limiting each image field to one part. The problem is that a preceding frame imparts an influence on a next frame.

SUMMARY OF THE INVENTION

This invention has been made having regard to the state of the art noted above, and its object is to provide an image sensor, and an imaging apparatus using the image sensor, for reducing the influence of a preceding read area.

The above object is fulfilled, according to this invention, by an image sensor for obtaining images, comprising a light or radiation detector for detecting light or radiation by converting light or radiation information to charge information in response to incident light or radiation, and reading the charge information; and a control device for controlling the detector to perform a reading operation for reading the charge information and a reset operation for resetting and discarding the charge information, during a frame cycle from a reading point of time for reading charge information collectively from a predetermined read area to a reading point of time for reading charge information collectively from a next predetermined read area.

The image sensor according to this invention regards, as a frame cycle, a period from a reading point of time for reading charge information collectively from a predetermined read area to a reading point of time for reading charge information collectively from a next predetermined read area. The control device controls the light or radiation detector to perform a reading operation for reading the charge information and a reset operation for resetting and discarding the charge information during the frame cycle. When the reset operation is carried out after the reading operation during the frame cycle, the charge information having been read from the predetermined read area is discarded and reset by the reset operation. Consequently, the influence of the preceding read area is reduced in time of collectively reading charge information from the next predetermined read area. When the reset operation is carried out before the reading operation during the frame cycle, the charge information having been read last time is discarded and reset by the reset operation. Consequently, the influence of the preceding read area is reduced in time of collectively reading the charge information from the current read area. In this way, the control device controls the detector to perform the reading operation and reset operation during the frame cycle, thereby reducing the influence of the preceding predetermined read area.

One example and another example of the image sensor according to the invention described above have the following constructions based on findings to be described in detail hereinafter.

The former example further comprises a driving device for driving the detector by applying a driving signal to each line; wherein the control device performs controls to drive the detector in the reading operation by applying the driving signal to each line to read the charge information for each line, and in the reset operation not to apply the driving signal simultaneously to adjacent lines.

The latter example further comprises a driving device for driving the detector by applying a driving signal to each line; wherein the control device performs controls to drive the detector in the reading operation by applying the driving signal to each line group to read the charge information for each line group, each line group having n adjacent lines, n being an integer 2 or more, and in the reset operation not to apply the driving signal simultaneously to adjacent line groups.

In the former example, as in the image sensor according to this invention, the control device controls the detector to perform a reading operation for reading charge information and a reset operation for resetting and discarding the charge information during a frame cycle from a reading point of time for reading charge information collectively from a predetermined read area to a reading point of time for reading charge information collectively from a next predetermined read area. Consequently, the influence of the preceding read area is reduced.

Further, in the former example, the driving signal is not applied simultaneously to adjacent lines in the reset operation. This prevents offset errors that would produce artifacts in stripe form appearing on an image. Similarly, in the latter example, where each line group has n adjacent lines, n being an integer 2 or more, the driving signal is not applied simultaneously to adjacent line groups in the reset operation. Thus, also when the detector is driven in the reading operation by applying the driving signal to each line group to read the charge information for each line group, offset errors are prevented that would produce artifacts in stripe form appearing on an image.

This invention is useful particularly when the above reset operation is carried out in a mode of selectively reading charge information by limiting the predetermined read area to a part of an image field (this mode being called hereinafter "partial reading mode") since charge information remains outside the read area, i.e. in an out-field. That is, by adopting the partial reading mode, the reset operation will reset the charge information (in the out-field) outside the read area limited to a part of the image field. Thus, the influence of the charge information of the out-field is reduced by the reset operation.

When performing the reset operation, the driving device, typically a gate driver circuit, for driving the detector by applying the driving signal to each line applies the driving signal simultaneously to all the lines en bloc (e.g. turns on all the gate lines simultaneously). It has been found that, if the driving signal is applied simultaneously to all the lines in the partial reading mode, an offset occurs to each line in time of reading charge information from the part of the image field noted above. This gives rise to another problem of artifacts in stripe form appearing on an image.

In order to solve the above problem, Inventor has made the following findings in connection with the two examples noted above. As a result of considering the mechanism that causes the above problem, a rational illustrative model as shown in FIGS. 13A, 13B and 14 has been conceived.

This illustrative model will be described by taking a flat panel X-ray detector (hereinafter called "FPD" as appropriate) as an example of the light or radiation detector, where all gate lines are turned on simultaneously by applying the driving signal simultaneously to all the lines of the FPD. FIGS. 13A and 13B show a partial layout of the flat panel X-ray detector showing one data line. FIG. 13A is a plan view, and FIG. 13B a sectional view. FIG. 14 is an equivalent circuit of a thin film transistor in the flat panel X-ray detector.

Figure 13A:
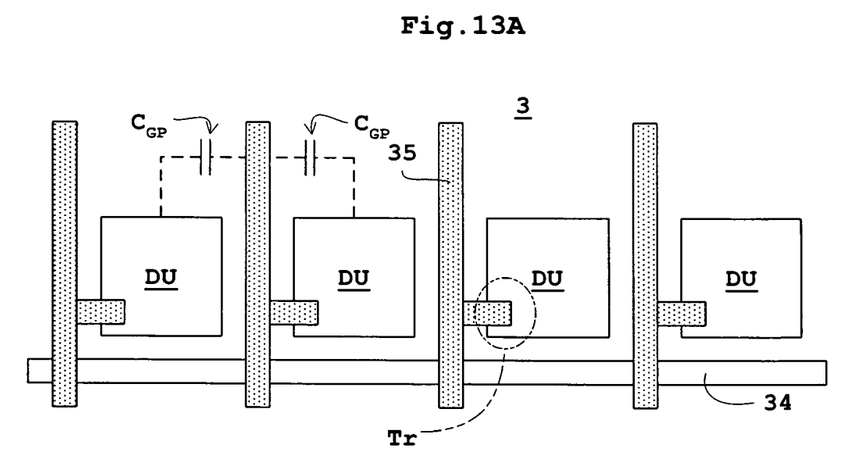
FIG. 13A is a plan view of a partial layout of a flat panel X-ray detector showing one data line.
Figure 13B:
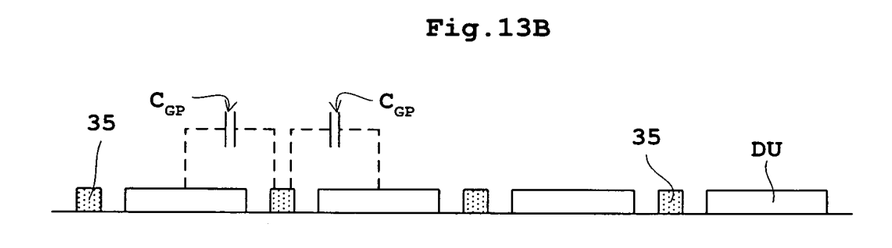
FIG. 13B is a sectional view of the partial layout of the flat panel X-ray detector showing the one data line.
Figure 14:
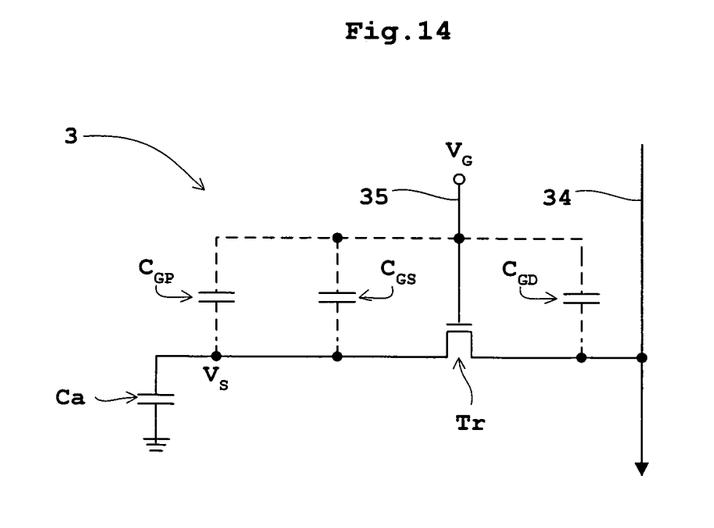
FIG. 14 is an equivalent circuit of a thin film transistor in the flat panel X-ray detector.

As shown in FIGS. 13A and 13B, the flat panel X-ray detector (FPD) 3 has, arranged in a two-dimensional matrix of rows and columns, data lines 34 (only one being shown in FIGS. 13A and 13B), gate lines 35, thin-film transistors (TFT) Tr and detecting elements DU. Each detecting element DU has a capacitor Ca (see FIG. 14) for storing carriers (charge information). As shown in FIGS. 13A, 13B and 14, parasitic capacitance from a gate line 35 connected to each detecting element DU includes $C_{GP}$ resulting from the wiring layout of the thin-film transistor Tr, and gate source overlap capacity $C_{GS}$ of the thin-film transistor Tr. As shown in FIG. 14, parasitic capacitance from a data line 34 is gate/drain overlap capacity $C_{GD}$ of the thin-film transistor Tr.

When a certain gate line 35 is turned on for switching, a carrier feed through occurs via the parasitic capacitance ($C_{GP}+C_{GS}$) to the detecting element DU connected to the gate line 35. Simultaneously therewith, a carrier feed through occurs via the parasitic capacitance $C_{GP}$ also to an adjoining detecting element DU. Thus, an equivalent circuit is expressed as in FIG. 14.

The important point here is that, when a certain gate line 35 is turned on and driven to read carriers from the detecting element DU belonging to this gate line 35, a feed through occurs via the parasitic capacitance not only to the detecting element DU to be read from, but also to a detecting element DU adjacent thereto across the gate line 35. The carrier value (value of charge amount) of a feed through from an adjoining gate line 35 connected to this adjoining detecting element DU is $C_{GP} \times (V_{GON}-V_{GOFF})$ when the gate line 35 is turned on, and $-C_{GP} \times (V_{GON}-V_{GOFF})$ of reversed polarity when turned off. Here, $V_{GON}$ is a voltage when gate voltage is on, and $V_{GOFF}$ is a voltage when gate voltage is off. That is, through cycles of OFF→ON→OFF, this influence will be canceled by reversed polarity. However, this requires a precondition "the adjoining detecting element DU is always off".

When all the gate lines 35 are turned on simultaneously to drive all the gate lines 35 en bloc, the precondition "the adjoining detecting element DU is always off" does not hold. Therefore, the influence of the adjoining gate line 35 must be taken into consideration. That is, when changing from ON to OFF, it is necessary to add the feed through from its own gate line 35 and the feed through from an adjoining gate line 35. In this case, TFT source terminal potential (offset voltage) $V_S$ shown in FIG. 14 is expressed by the following equation (1) and also the following equation (2):

$$V_S = -(C_{GP}+C_{GS}) \times (V_{th}-V_{GOFF})//Ca$$

$$-C_{GP} \times (V_{th}-V_{GOFF})//Ca \quad (1)$$

$$= -(2 \times C_{GP}+C_{GS}) \times (V_{th}-V_{GOFF})//Ca \quad (2)$$

The first term in the right-hand side of the above equation (1), $[-(C_{GP}+C_{GS}) \times (V_{th}-V_{GOFF})//Ca]$, expresses the influence of the gate line 35 of the subject detecting element DU, which is the same as when each detecting element DU is driven separately. The second term in the right-hand side of the above equation (1), $[-C_{GP} \times (V_{th}-V_{GOFF})//Ca]$, expresses the influence of the gate line 35 of the adjoining detecting element DU. It is considered, therefore, that a change from the usual successive driving lies in the potential of the second term in the right-hand side of the above equation (1), $[-C_{GP}(V_{th}-V_{GOFF})//Ca]$. The amount of variation $\Delta V_S$ is expressed by the following equation (3):

$$\Delta V_S = (C_{GP}+C_{GS}) \times (V_{th}-V_{GOFF})//Ca \quad (3)$$

In summary, it may be concluded that, compared with the usual successive driving, the influence is reduced by an amount corresponding to delta $V_S$ in the above equation (3).

Assuming that the conclusion on the above illustrative model is valid, in order to prevent offset errors, it is important to maintain constantly the condition "the adjoining detecting element DU is always off." It has been found based on such illustrative model that a reset operation not applying the driving signal simultaneously to adjacent lines effectively prevents offset errors that would cause artifacts to appear in stripe form on an image.

In the invention described above, it is preferred that the image sensor further comprises an amplifying device for amplifying the charge information; wherein the control device performs controls to reset the amplifying device in the reset operation.

The feature that the amplifying device is reset by the reset operation prevents the output of the amplifying device from deflecting out of control during the reset operation. Consequently, a smooth change is made from the reset operation to a next reading operation.

In a partial reading mode for selectively reading the charge information from the predetermined read area limited to a part of an image field, the reading operation may be performed for the read area limited, the reset operation being performed for an out-field other than the read area limited. In a reading mode for reading the charge information from the predetermined read area corresponding to a total image field, the reading operation and the reset operation may be performed for the total image field. Where the partial reading mode is adopted, the reset operation resets the charge information from the out-field other than the read area limited to a part of the image field. Thus, the influence of the charge information from the out-field is reduced by the resetting.

In the invention described hereinbefore, where the image sensor includes charge-transferring transistors; and gate lines connected to the gates of the transistors, the driving signal may be applied as follows. For example, the driving signal has a voltage $V_{GON}$ corresponding to a gate voltage in ON state, and a driving signal $V_{GON}$ is applied to the gate lines to turn on the gate lines to drive the detector. Alternatively, the driving signal has a voltage $V_{GOFF}$ corresponding to a gate voltage in OFF state, and a driving signal $V_{GOFF}$ is applied to the gate lines to turn off the gate lines to drive the detector.

The control device performs controls, in the reading operation, to drive the detector by applying the drive signal to one line after another to read the charge information line by line, and in the reset operation, not to apply the drive signal simultaneously to adjacent lines. A specific example of this control is as follows.

The lines are divided into a first set and a second set of alternate lines, the reset operation being carried out such that, while the driving signal is applied simultaneously to the first set of alternate lines, the driving signal is not applied to the second set of alternate lines, and that, while the driving signal is applied simultaneously to the second set of alternate lines, the driving signal is not applied to the first set of alternate lines.

In a further aspect of the invention, an imaging apparatus using an image sensor is provided, the image sensor having a light or radiation detector for detecting light or radiation by converting light or radiation information to charge information in response to incident light or radiation, and reading the charge information, the apparatus comprising the image sensor; an image processing device for performing image processing; and a control device for controlling the detector to perform a reading operation for reading the charge information and a reset operation for resetting and discarding the charge information, during a frame cycle from a reading point of time for reading charge information collectively from a predetermined read area to a reading point of time for reading charge information collectively from a next predetermined read area.

In the imaging apparatus according to this invention, the control device controls the detector to perform a reading operation for reading charge information and a reset operation for resetting and discarding the charge information during a frame cycle from a reading point of time for reading charge information collectively from a predetermined read area to a reading point of time for reading charge information collectively from a next predetermined read area. Consequently, the influence of the preceding read area is reduced.

In the imaging apparatus according to this invention, the control device may be disposed outside the image sensor, or may be disposed inside the image sensor.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

A preferred embodiment of this invention will be described in detail hereinafter with reference to the drawings.

Figure 2:
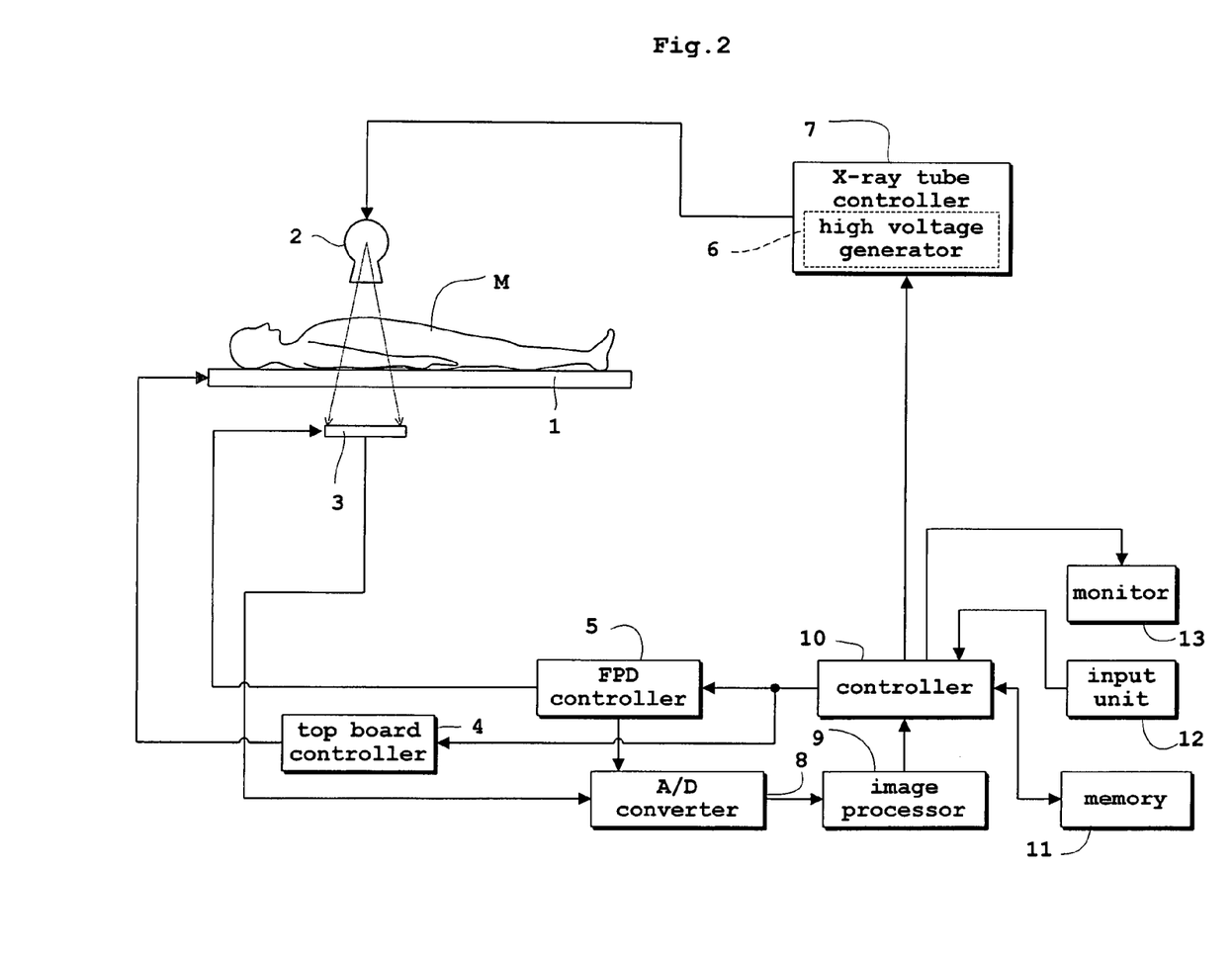
FIG. 2 is a block diagram of an X-ray fluoroscopic apparatus according to this invention.
Figure 3:
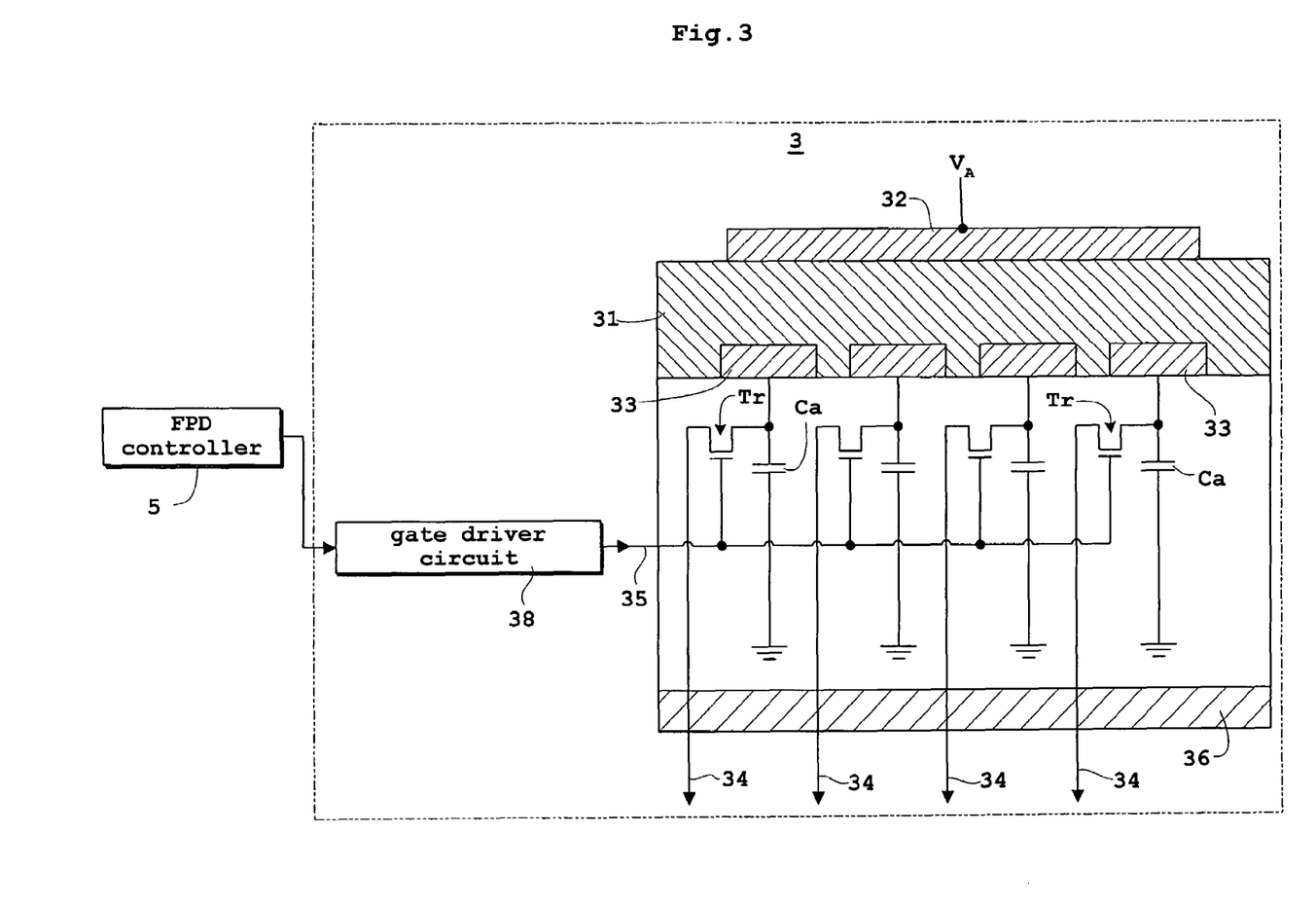
FIG. 3 is an equivalent circuit, seen in side view, of a flat panel X-ray detector used in the X-ray fluoroscopic apparatus.
Figure 4:
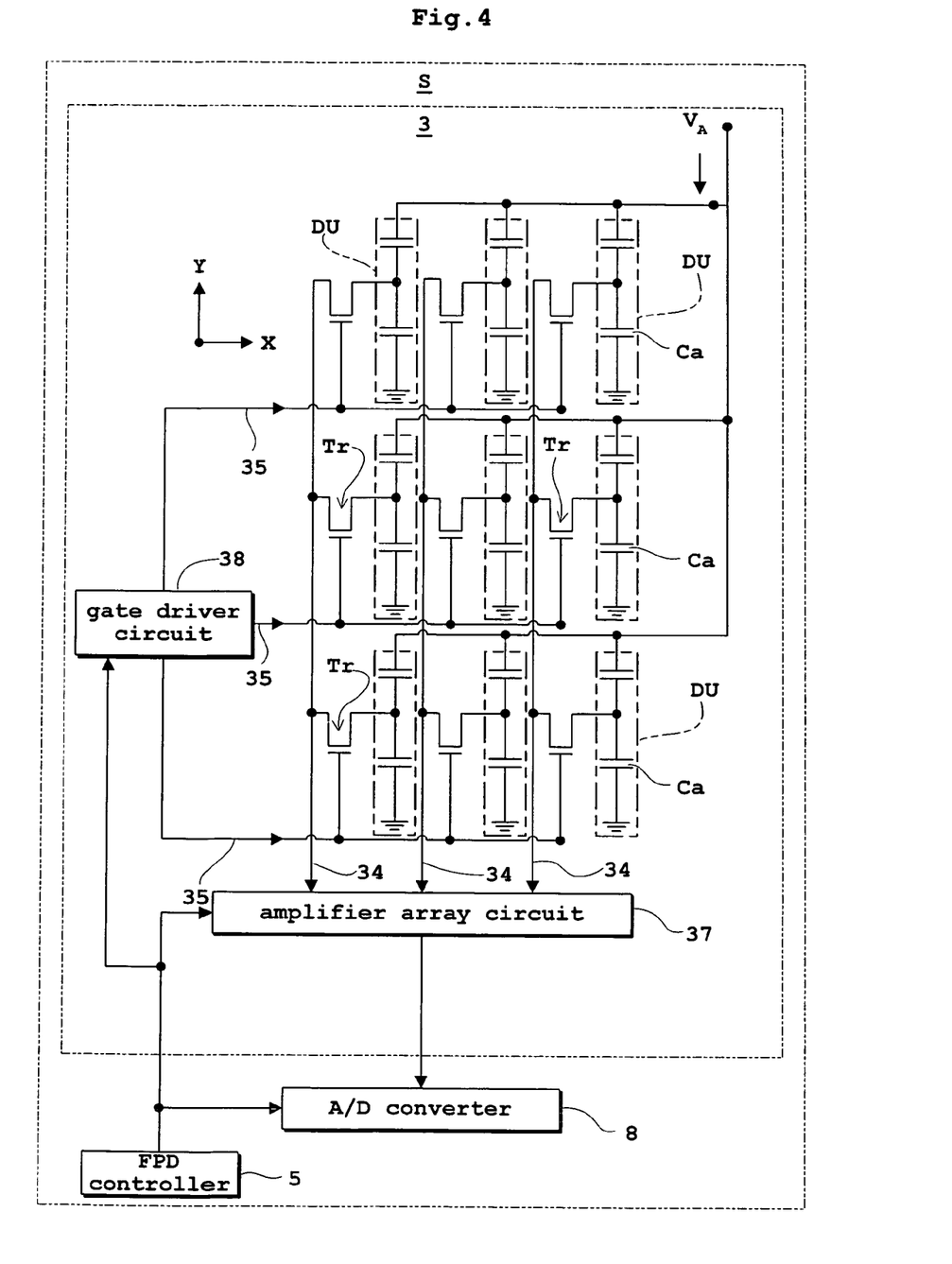
FIG. 4 is an equivalent circuit, seen in plan view, of the flat panel X-ray detector.

FIG. 2 is a block diagram of an X-ray fluoroscopic apparatus according to this invention. FIG. 3 is an equivalent circuit, seen in side view, of a flat panel X-ray detector used in the fluoroscopic apparatus. FIG. 4 is an equivalent circuit, seen in plan view, of the flat panel X-ray detector.

Figure 5:
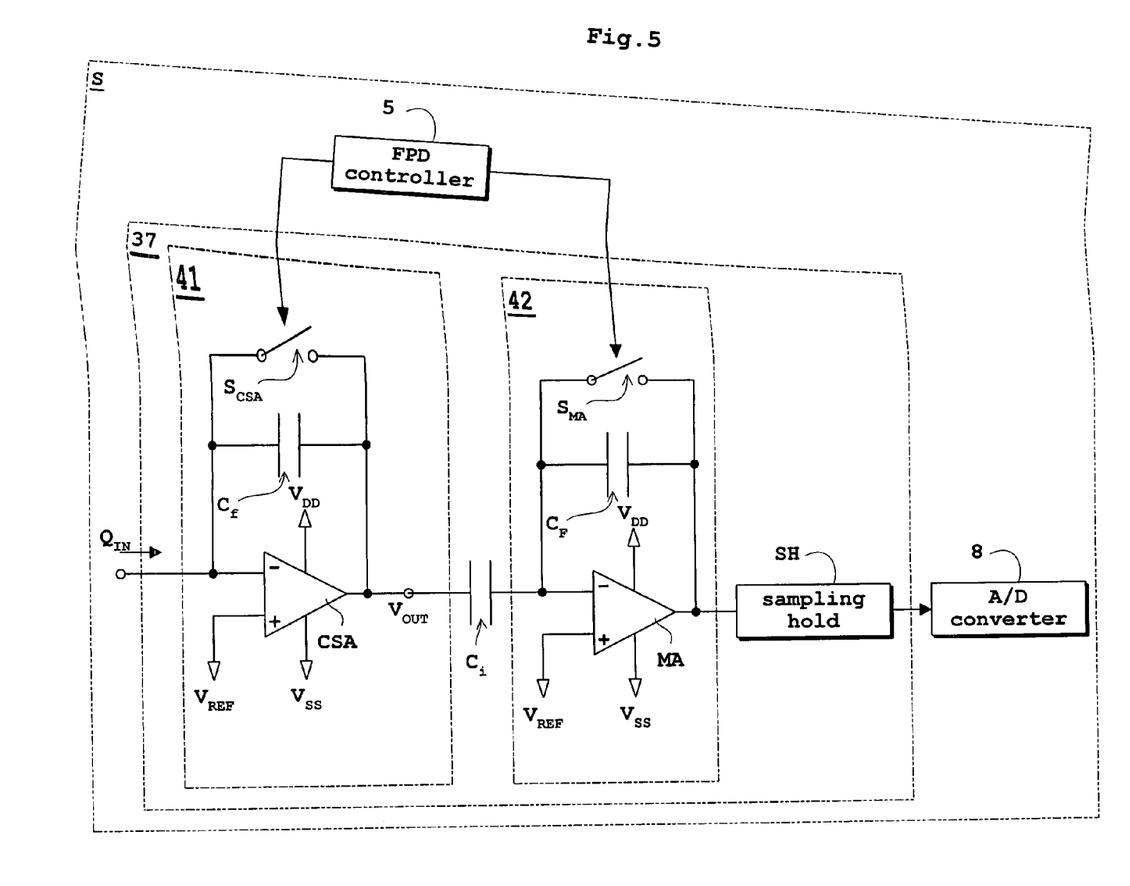
FIG. 5 is a block diagram of an amplifier array circuit in the flat panel X-ray detector according to the invention.

FIG. 5 is a block diagram of an amplifier array circuit in the flat panel X-ray detector. This embodiment will be described, taking the flat panel X-ray detector (hereinafter called "FPD" as appropriate) as an example of light or radiation detecting device, and the fluoroscopic apparatus as an example of imaging apparatus.

As shown in FIG. 2, the fluoroscopic apparatus in this embodiment includes a top board 1 for supporting a patient M, an X-ray tube 2 for emitting X rays toward the patient M, and an FPD 3 for detecting X rays transmitted through the patient M. The FPD 3 corresponds to the radiation detector in this invention.

The fluoroscopic apparatus further includes a top board controller 4 for controlling vertical and horizontal movements of the top board 1, an FPD controller 5 for controlling scanning action of the FPD 3, an X-ray tube controller 7 having a high voltage generator 6 for generating a tube voltage and tube current for the X-ray tube 2, an analog-to-digital converter 8 for fetching X-ray detection signals which are charge signals from the FPD 3 and digitizing the signals, an image processor 9 for performing various processes based on the X-ray detection signals outputted from the analog-to-digital converter 8, a controller 10 for performing an overall control of these components, a memory 11 for storing processed images, an input unit 12 for the operator to input various settings, and a monitor 13 for displaying the processed images and other information.

The top board controller 4 controls movements of the top board 1, such as moving the top board 1 horizontally to place the patient M in an imaging position, vertically moving and/or rotating the top board 1 to set the patient M to a desired position, horizontally moving the top board 1 during an imaging operation, and horizontally moving the top board 1 to withdraw the patient M from the imaging position after the imaging operation. The FPD controller 5 controls scanning action by moving the FPD 3 horizontally or revolving the FPD 3 about the body axis of patient M. The high voltage generator 6 generates the tube voltage and tube current for the X-ray tube 2 to emit X rays. The X-ray tube controller 7 controls scanning action by moving the X-ray tube 2 horizontally or revolving the X-ray tube 2 about the body axis of patient M, and controls setting of a coverage of a collimator (not shown) disposed adjacent the X-ray tube 2. In time of scanning action, the X-ray tube 2 and FPD 3 are moved while maintaining a mutually opposed relationship, so that the FPD 3 may detect X rays emitted from the X-ray tube 2.

The controller 10 has a central processing unit (CPU) and other elements. The memory 11 has storage media, typically a ROM (Read-Only Memory) and a RAM (Random Access Memory). The input unit 12 has a pointing device, typically a mouse, keyboard, joy stick, trackball and/or touch panel. The fluoroscopic apparatus creates images of the patient M, with the FPD 3 detecting X rays transmitted through the patient M, and the image processor 9 performing an image processing based on the X rays detected. The image processor 9 corresponds to the image processing device in this invention.

In this embodiment, the FPD controller 5 has functions to perform a reading operation for reading carriers (charge information) and a reset operation for resetting and discarding the carriers during a frame cycle. Further, in this embodiment, the FPD controller 5 successively turns on gate lines 35 described hereinafter to drive the FPD 3 and read carriers for each gate line 35 in the above reading operation, and performs controls not to turn on adjacent gate lines 35 simultaneously in the reset operation. Particulars of the functions of the FPD controller 5 will be described hereinafter. The FPD 3 and FPD controller 5 constitute the image sensor in this invention (see the image sensor S in FIG. 4). The FPD controller 5 corresponds to the control device in this invention.

As shown in FIG. 3, the FPD 3 includes a radiation sensitive thick semiconductor film 31 for generating carriers in response to incident radiation such as X rays, a voltage application electrode 32 formed on the surface of thick semiconductor film 31, carrier collecting electrodes 33 arranged on the back surface remote from the radiation incidence side of the thick semiconductor film 31, capacitors Ca for storing charges corresponding to the carriers collected by the carrier collecting electrodes 33, and thin film transistors (TFT) Tr acting as switching elements, normally turned off, for transferring the charges from the capacitors Ca. In this embodiment, the thick semiconductor film 31 is formed of a radiation sensitive material which generates carriers in response to incident radiation, such as amorphous selenium. The thick semiconductor film 31 may be formed of a light sensitive material for generating carriers in response to incident light.

In addition to the above components, the FPD 3 in this embodiment has data lines 34 connected to the sources of the thin film transistors Tr, and gate lines 35 connected to the gates of the thin film transistors Tr. The voltage application electrode 32, thick semiconductor film 31, carrier collecting electrodes 33, capacitors Ca, thin film transistors Tr, data lines 34 and gate lines 35 are laminated on an insulating substrate 36.

As shown in FIGS. 3 and 4, the capacitors Ca and thin film transistors Tr are connected, respectively, to the numerous (e.g. 1,024×1,024 or 4,096×4,096) carrier collecting electrodes 33 arranged in a two-dimensional matrix of rows and columns. Each set of carrier collecting electrode 33, capacitor Ca and thin film transistor Tr acts as a separate detecting element DU. The voltage application electrode 32 is formed over the entire surface as a common electrode of all the detecting elements DU. As shown in FIG. 4, the data lines 34 form a plurality of columns juxtaposed in the horizontal (X) direction, while the gate lines 35 form a plurality of rows juxtaposed in the vertical (Y) direction. Each data line 34 and each gate line 35 are connected to the detecting elements DU. The data lines 34 are connected to an amplifier array circuit 37. The gate lines 35 are connected to a gate driver circuit 38. The number of detecting elements DU is not limited to 1,024× 1,024 or 4,096×4,096, but is variable according to forms of implementation. Thus, only one detecting element DU may be provided.

The detecting elements DU are patterned in the two-dimensional matrix arrangement on the insulating sub-strate 36. The insulating substrate 36 having the detecting elements DU patterned thereon is also called "active matrix substrate".

For forming the detecting elements DU and adjacent components of FPD 3, the data lines 34 and gate lines 35 are wired, and the thin film transistors Tr, capacitors Ca, carrier collecting electrodes 33, thick semiconductor film 31 and voltage application electrode 32 are successively laminated on the surface of the insulating substrate 36 by using a thin film formation technique based on various vacuum deposition method or photolithographic patterning. The semiconductor for forming the thick semiconductor film 31 may be selected appropriately according to use and electric strength, as exemplified by amorphous semiconductor and polycrystallized semiconductor.

Thus, the gate driver circuit 38 has a function to drive the FPD 3 by applying a driving signal to each gate line 35. The gate driver circuit 38, therefore, corresponds to the driving device in this invention. In this embodiment, for example, the driving signal has a voltage $V_{GON}$ corresponding to a gate voltage in ON state. The driving signal ($V_{GON}$) is applied to each gate line 35 to drive the FPD 3.

The amplifier array circuit 37, including an analog-to-digital converter 8 disposed externally of the FPD 3, has a function to receive the carriers based on read signals relating to reading of the carriers. The analog-to-digital converter 8 may be included in the construction of FPD 3. These gate driver circuit 38, amplifier array circuit 37 and analog-to-digital converter 8 are the peripheral circuits of the FPD 3.

The amplifier array circuit 37 has a function to perform amplification. The amplifier array circuit 37, therefore, corresponds to the amplifying device in this invention.

As shown in FIG. 5, the amplifier array circuit 37 includes two stages of amplifier circuits 41 and 42, and a sampling hold SH. The amplifier circuit 41 disposed Upstream with respect to the direction of carrier reading, i.e. at the first stage, is a circuit for a charge sensitive amplifier CSA. The amplifier circuit 42 disposed downstream, i.e. at the second stage, is a circuit for a charge sensitive main amplifier MA. The amplifier circuits 41 and 42, and the sampling hold SH at the final stage, are electrically connected in order in the direction of carrier reading.

The charge sensitive amplifier CSA at the first stage and the charge sensitive main amplifier MA at the second stage convert the carriers to voltages for output. A capacitor $C_i$ is disposed between the two amplifiers CSA and MA for converting output voltages $V_{OUT}$ of the charge sensitive amplifier CSA at the first stage to charges. The charge sensitive main amplifier MA at the second stage converts the charges outputted from the capacitor $C_i$ to voltages again. Capacitors $C_f$ and $C_F$ are electrically connected between inputs and outputs of the two amplifiers CSA and MA, and in parallel to the amplifiers CSA and MA, respectively. The capacitor $C_F$ and the charge sensitive main amplifier MA at the second stage constitute the amplifier circuit 42 at the second stage.

The two amplifiers CSA and MA are in the form of operational amplifiers. Each amplifier is powered by a positive supply $V_{DD}$ and a negative supply $V_{SS}$, and a reference voltage $V_{REF}$ is inputted to a positive input of each operational amplifier. Normally, the reference voltage $V_{REF}$ is set to a mean level between positive supply $V_{DD}$ and negative supply $V_{SS}$. When, for example, positive supply $V_{DD}$=5.0V and negative supply $V_{SS}$=-5.0V, reference voltage $V_{REF}$=0V. When positive supply $V_{DD}$=5.0V and negative supply $V_{SS}$=0V, reference voltage $V_{REF}$=2.5V.

In the case of charge sensitive amplifier CSA at the first stage, when carrier $Q_{IN}$ is inputted to the amplifier CSA, an output of the amplifier CSA exhibits the following behavior. When carrier $Q_{IN}$ is zero, the output voltage $V_{OUT}$ which is the amplifier output becomes equal to the reference voltage $V_{REF}$. When carrier $Q_{IN}$ is positive ($Q_{IN}$>0), the output deflects toward the negative supply $V_{SS}$ (in the negative direction) with respect to the reference voltage $V_{REF}$. When carrier $Q_{IN}$ is negative ($Q_{IN}$<0), the output deflects toward the positive supply $V_{DD}$ (in the positive direction) with respect to the reference voltage $V_{REF}$.

The two amplifiers CSA and MA, respectively, have changeover switches $S_{CSA}$ and $S_{MA}$ electrically connected in parallel thereto, as are the capacitors $C_f$ and $C_F$. When the changeover switches $S_{CSA}$ and $S_{MA}$ are turned on, the carriers accumulated in the capacitors $C_f$ and $C_F$ are discharged therefrom. When the changeover switches $S_{CSA}$ and $S_{MA}$ are turned off, carriers begin to accumulate in the capacitors $C_f$ and $C_F$.

In this embodiment in particular, the FPD controller 5 carries out a reset operation by turning off the changeover switches $S_{CSA}$ and $S_{MA}$ to discharge the carriers. That is, in the reset operation, the FPD controller 5 controls to reset the amplifier array circuit 37.

Figure 6:
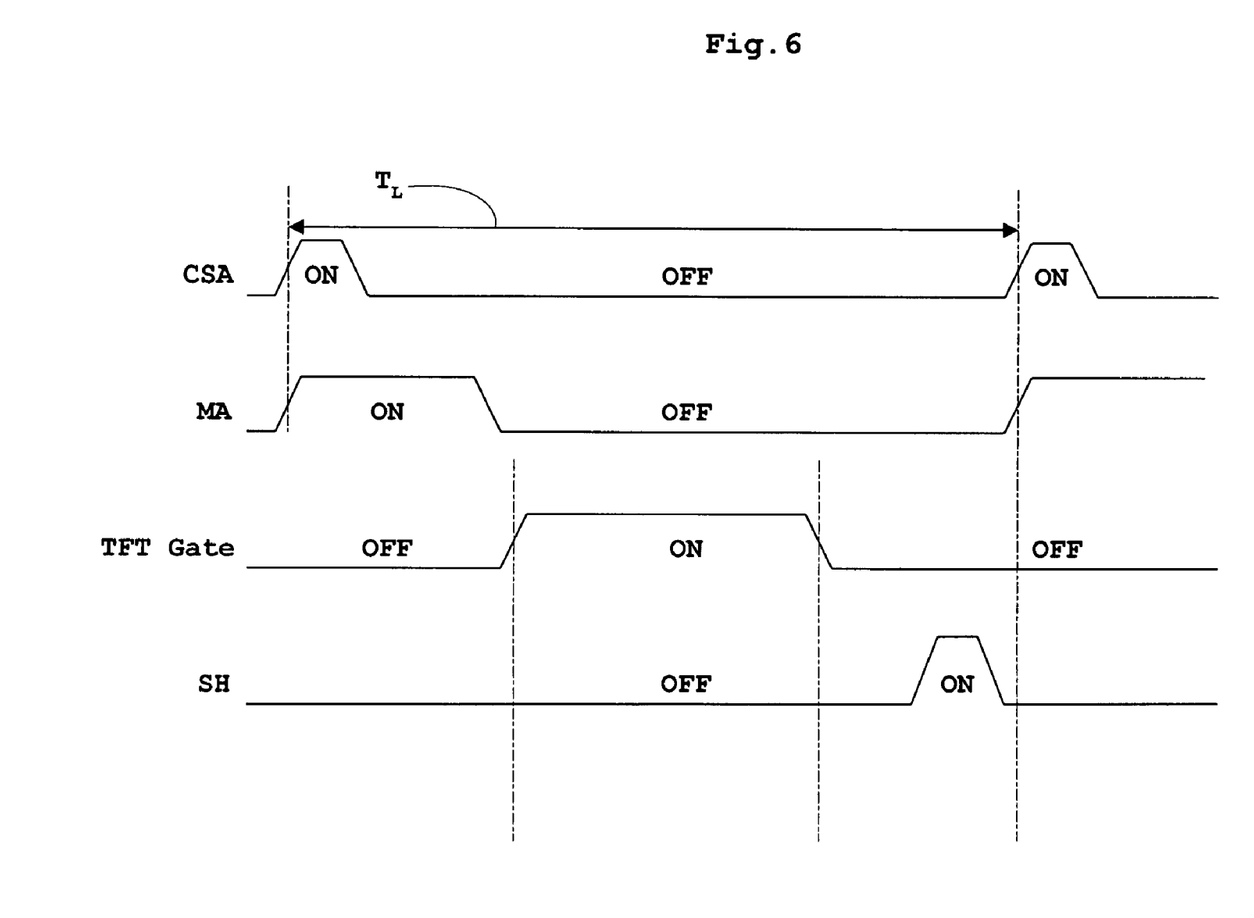
FIG. 6 is a timing chart showing an operating sequence of the amplifier array circuit according to the invention.

The FPD controller 5 controls the timing of each signal in the operating sequence of the amplifier array circuit 37 in FIG. 6 described hereinafter. The FPD controller 5 also performs a drive control of gate lines 35 illustrated in the operating sequence shown in FIG. 8 described hereinafter.

Operation of the X-ray fluoroscopic apparatus and flat panel X-ray detector (FPD) in this embodiment will be described next. Radiation to be detected is emitted to the FPD 3 in the state of a high bias voltage $V_A$ (e.g. several hundred volts to several tens of kilovolts) being applied to the voltage application electrode 32. This bias voltage $V_A$ is applied also under control of the FPD controller 5.

Carriers are generated by incidence of the radiation, and are stored as charge information in the capacitors Ca for charge accumulation. A gate line 35 is selected by a signal-fetching scan signal (i.e. gate driving signal) to the gate driver circuit 38. As a result, the detecting elements DU connected to this gate line 35 are designated. The charges stored in the capacitors Ca of the designated detecting elements DU are outputted to the data line 34 via the thin film transistors Tr turned on by the signal on the selected gate line 35.

The address of each detecting element DU is designated based on the signal fetching scan signals on the data line 34 and gate line 35 (i.e. the gate driving signal on the gate line 35 and amplifier driving signal on the data line 34). When a signal fetching scan signal is inputted to the gate driver circuit 38, each detecting element DU is selected by a scan signal (gate driving signal) of the vertical (Y) direction outputted from the gate driver circuit 38. Then, the amplifier array circuit 37 is switched by a scan signal of the horizontal (X) direction (amplifier driving signal), whereby the charges from the capacitor Ca of a selected detecting element DU is outputted to the amplifier array circuit 37 through the data line 34. The charges are amplified by the amplifier array circuit 37, and outputted as X-ray detection signals from the amplifier array circuit 37 to the analog-to-digital converter 8. The X-ray detection signals are outputted after being converted from the form of carriers to the form of voltages by each of the amplifiers CSA and MA of the amplifier array circuit 37.

Where the image sensor S having the FPD 3 in this embodiment is used in the fluoroscopic apparatus for detecting an X-ray fluoroscopic image, for example, the above operation causes the amplifier array circuit 37 to amplify charge information (X-ray detection signals) read through the data lines 34 as voltages, convert it to image information and output it as an X-ray fluoroscopic image.

Next, an example of operating sequence of the amplifier array circuit 37 will be described with reference to FIG. 6. FIG. 6 is a timing chart showing an operating sequence of the amplifier array circuit 37 in this embodiment. "CSA" in FIG. 6 shows ON (carrier discharge) or OFF (carrier accumulation) of the switch $S_{CSA}$ electrically connected to the charge sensitive amplifier CSA at the first stage. "MA" in FIG. 6 shows ON (carrier discharge) or OFF (carrier accumulation) of the switch $S_{MA}$ electrically connected to the charge sensitive main amplifier MA at the second stage. "TFT Gate" in FIG. 6 shows ON or OFF of the gates of thin film transistors Tr. "SH" in FIG. 6 shows ON or OFF of the sampling hold SH. With "CSA" and "MA", the period from one ON to the next ON corresponds to a read cycle for one data line 34 (see read cycle $T_L$ in FIG. 6). With "TFT Gate", one ON/OFF switching corresponds to an actual reading period for one data line 34.

When the FPD controller 5 turns on the changeover switches $S_{CSA}$ and $S_{MA}$ (see ON of "CSA" and "MA" in FIG. 6), the capacitors $C_f$ and $C_F$ discharge the carriers accumulated therein by way of a resetting with regard to the carriers accumulated last time. The FPD controller 5 turns off the changeover switch $S_{CSA}$ first (see OFF of "CSA" in FIG. 6), and then turns off the changeover switch $S_{MA}$ (see OFF of "MA" in FIG. 6). This change to the OFF state constitutes a preparatory step for accumulation of carriers in the capacitors $C_f$ and $C_F$.

While the FPD controller 5 keeps on the gates of thin-film transistors Tr (see ON of "TFT Gate" in FIG. 6), carriers are read through one data line 34 and inputted to the amplifier array circuit 37.

When the FPD controller 5 turns off the gates of thin-film transistors Tr (see OFF of "TFT Gate" in FIG. 6), output voltage $V_{OUT}$ of the charge sensitive amplifier CSA at the first stage deflects with respect to the reference voltage $V_{REF}$.

The capacitor $C_i$ converts the output voltage $V_{OUT}$ obtained from the amplifier CSA to carriers. The charge sensitive main amplifier MA at the second stage converts the carriers to voltage again. This amplifier MA outputs the voltage as data of X-ray detection signals. When the FPD controller 5 turns on the sampling hold SH (see ON of "SH" in FIG. 6), the data outputted from the charge sensitive main amplifier MA at the second stage is sampled and held.

Figure 7:
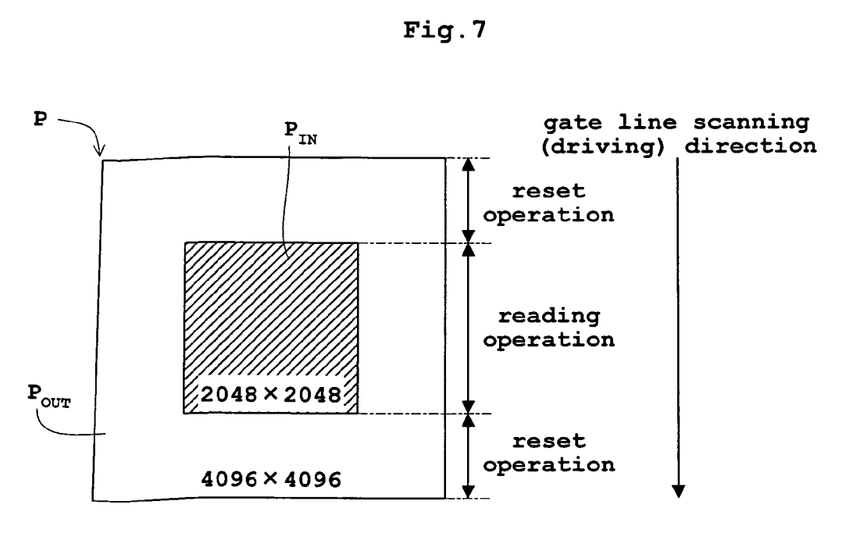
FIG. 7 is an explanatory view schematically showing a total field and an image field in a partial reading mode.
Figure 8:
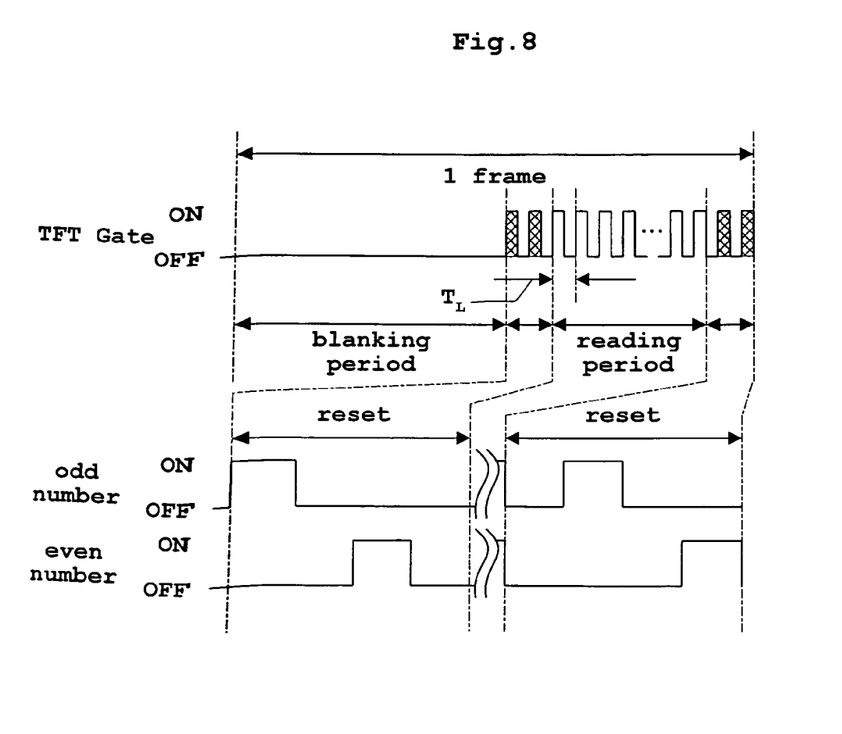
FIG. 8 is a timing chart showing an operating sequence for driving control of gate lines, and a timing chart showing in serial enlargement, an operating sequence of odd-numbered and even-numbered gate lines.
Figure 9A:
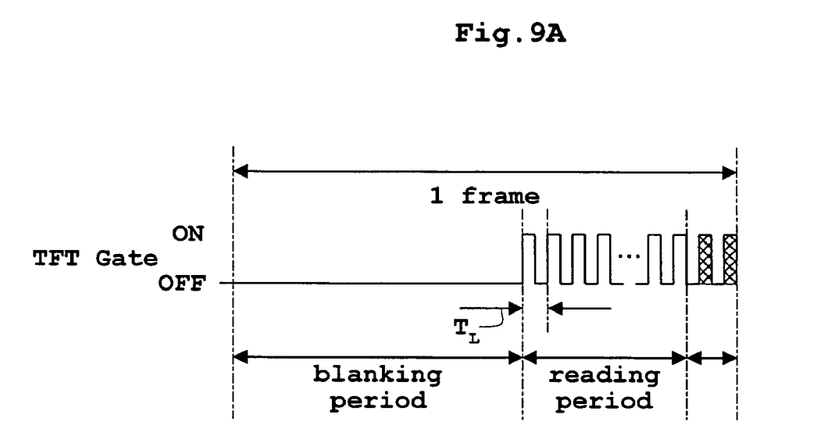
FIG. 9A is a timing chart showing an embodiment different from what is shown in FIG. 8.
Figure 9B:
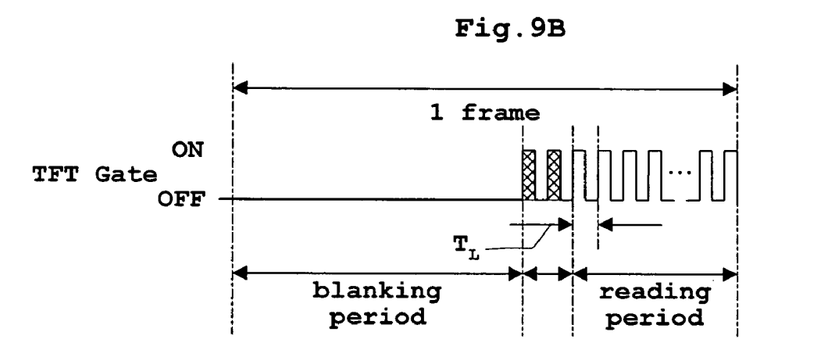
FIG. 9B is a timing chart showing another embodiment different from what is shown in FIG. 8.
Figure 10:
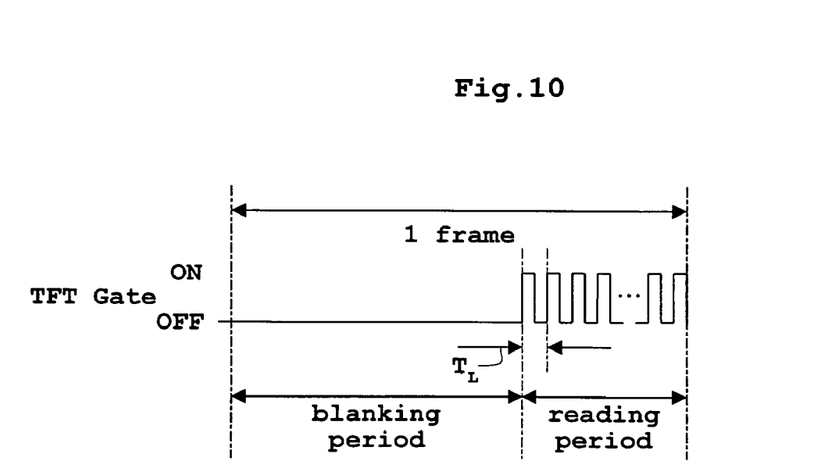
FIG. 10 is a timing chart showing a conventional operating sequence for drive control of gate lines, for comparison with FIGS. 8, 9A and 9B.

Next, a mode of selectively reading carriers (charge information) by limiting a predetermined read area to a part of an image field (partial reading mode) will be described with reference to FIG. 7. One example of operating sequence for driving control of the gate lines 35 in the partial reading mode will also be described with reference to FIGS. 8, 9A and 9B. FIG. 7 is an explanatory view schematically showing a total field and an image field in the partial reading mode. FIG. 8 is a timing chart showing an operating sequence for driving control of gate lines 35, and a timing chart showing in serial enlargement, an operating sequence of odd-numbered and even-numbered gate lines 35. FIGS. 9A and 9B are timing charts showing embodiments different from what is shown in FIG. 8. Reference is made also to FIG. 10 for comparison with FIGS. 8, 9A and 9B. FIG. 10 is a timing chart showing a conventional operating sequence for driving control of gate lines, for comparison with FIGS. 8, 9A and 9B.

In this embodiment, an example will be described where, from a total field of 4,096×4,096 pixels square, 2,048×2,048 pixels in the center are selected and read. "TFT Gate" in FIGS. 8, 9A, 9B and 10 shows ON or OFF of the gates of thin film transistors Tr as in FIG. 6.

The "frame" in this specification will be described hereinafter as a period from a point of time for reading carriers collectively from a predetermined read area to a point of time for reading carriers collectively from a next predetermined read area.

The sequences of FIGS. 8, 9A, 9B and 10, including the conventional example, relate to one frame. The read cycle $T_L$ shown in FIG. 6 is in a relationship with the one frame as shown in FIGS. 8, 9A, 9B and 10. In the conventional example, as shown in FIG. 10, where a time other than the reading for each line is a "blanking period", the one frame is divided into a reading period for actual reading and the blanking period. That is to say, in the conventional example, a cycle for each frame consists of a reading period and a blanking period.

On the other hand, in FIG. 8 showing this embodiment, and in FIGS. 9A and 9B, each frame includes, besides a reading period and a blanking period, reset periods for resetting and discarding carriers. In FIGS. 8, 9A and 9B, portions of the reset periods when the gate lines 35 are turned on (see "ON" for "TFT Gate" in FIGS. 8, 9A and 9B) are shown in cross-hatching.

As shown in FIG. 7, a predetermined read area is limited to the 2,048×2,048 pixels forming a central part of the total field P of 4,096×4,096 pixels. This read area is regarded as in-field $P_{IN}$ ("2048×2048" in FIG. 7). The area of the in-field $P_{IN}$ is shown in hatching with oblique lines extending rightward and upward in FIG. 7. The area of the total field P other than and outside the in-field $P_{IN}$ is regarded as out-field Pour. The direction in which the gate lines 35 are driven for scanning is as shown in FIG. 7.

In a reading operation in the partial reading mode, the FPD controller 5 turns on one gate line 35 after another to read carriers for every line (see "reading period" in FIGS. 8, 9A and 9B). In a reset operation, on the other hand, the FPD controller 5 does not turn on adjacent gate lines 35 simultaneously. In this embodiment, as shown in FIG. 8, the gate lines 35 are divided into odd-numbered and even-numbered lines. While the odd-numbered gate lines 35 are turned on simultaneously, the even-numbered gate lines 35 are turned off. Conversely, while the even-numbered gate lines 35 are turned on simultaneously, the odd-numbered gate lines 35 are turned off. (see "reset" in FIG. 8). A similar reset operation is carried out in the embodiments shown in FIGS. 9A and 9B.

In the embodiment shown in FIG. 8, the reset operation is carried out immediately before and immediately after the reading period. In the embodiments shown in FIGS. 9A and 9B, the reset operation is carried out immediately before or immediately after the reading period. In FIG. 9A, the reset operation is carried out after the reading operation in the cycle for one frame. In FIG. 9B, the reset operation is carried out before the reading operation in the cycle for one frame.

The reset operation shown in FIGS. 8, 9A and 9B rests the amplifier array circuit 37 shown in FIG. 5. In this embodiment, as described hereinbefore, the FPD controller 5 turns off the changeover switches $S_{CSA}$ and $S_{MA}$ to discharge the carriers by way of resetting.

According to the image sensor S in this embodiment described above, the FPD controller 5 controls the FPD 3 to perform the reading operation for reading carriers and the reset operation for resetting and discarding the carriers during a frame cycle from a point of time for collectively reading carriers, which provide charge information, from a predetermined read area (in this embodiment, the in-field $P_{IN}$ of 2,048×2,048 pixels in FIG. 7) to a point of time for collectively reading carriers from a next predetermined read area.

When the reset operation is carried out after the reading operation during the frame cycle as shown in FIG. 9A, the carriers having been read are discarded and reset by the reset operation. Consequently, the influence of the preceding read area is reduced in time of collectively reading carriers from a next predetermined read area.

When the reset operation is carried out before the reading operation during the frame cycle as shown in FIG. 9B, the carriers having been read last time are discarded and reset by the reset operation. Consequently, the influence of the preceding read area is reduced in time of collectively reading carriers from the current read area.

When the reset operation is carried out before and after the reading operation as shown in FIG. 8, it is possible to produce a combination of the effects of the embodiments shown in FIGS. 9A and 9B. In this way, the FPD controller 5 controls the FPD 3 to perform the reading operation and reset operation during the frame cycle as described above, thereby reducing the influence of the preceding predetermined read area.

In the reset operation, the driving signal is not applied simultaneously to adjacent lines. In this embodiment, in order that adjacent gate lines 35 do not turn on simultaneously in the reset operation, the gate lines 35 are divided into odd-numbered and even-numbered lines. While the odd-numbered gate lines 35 are turned on simultaneously, the even-numbered gate lines 35 are turned off. Conversely, while the even-numbered gate lines 35 are turned on simultaneously, the odd-numbered gate lines 35 are turned off. This control prevents offset errors that would produce artifacts in stripe form appearing on an image.

In this embodiment, the amplifier array circuit 37 is reset by the reset operation. This prevents the amplifier output, typically the output voltage $V_{OUT}$ of the charge sensitive amplifier CSA at the first stage, from deflecting out of control during the reset operation. Consequently, a smooth change is made from the reset operation to a next reading operation.

This invention is useful particularly in the partial reading mode according to this embodiment, in that carriers remain outside the read area (in-field $P_{IN}$), i.e. remain in the out-field $P_{OUT}$. That is, by adopting the partial reading mode, the reset operation will reset the carriers in the out-field $P_{OUT}$ outside the in-field $P_{IN}$ limited to a part of the image field (total field P). Thus, the influence of the carriers of the out-field Pour is reduced by the reset operation.

This invention is not limited to the foregoing embodiment, but may be modified as follows:

(1) In the embodiment described above, the fluoroscopic apparatus shown in FIG. 2 has been described by way of example. This invention may be applied also to a fluoroscopic apparatus mounted on a C-shaped arm, for example. This invention may be applied also to an X-ray CT apparatus.

(2) In the embodiment described above, the invention is applied to a radiation detector of the "direct conversion type" with the thick semiconductor film 31 (semiconductor layer) converting incident radiation directly to charge information. The invention is applicable also to a radiation detector of the "indirect conversion type" with a converting layer such as a scintillator converting incident radiation into light, and a semiconductor layer formed of a light sensitive material converting the light to charge information. The light sensitive semiconductor layer may be formed of photodiodes.

(3) In the embodiment described above, the X-ray detector for detecting X rays has been described by way of example. This invention is not limited to a particular type of radiation detector which may, for example, be a gamma-ray detector for detecting gamma rays emitted from a patient dosed with radioisotope (RI), such as in an ECT (Emission Computed Tomography) apparatus. Similarly, this invention is applicable to any imaging apparatus that detects radiation, as exemplified by the ECT apparatus noted above.

(4) In the above embodiment, the radiation detector for detecting radiation, typically X rays, has been described by way of example. This invention is applicable also to a photodetector for detecting light. Thus, the invention is not limited to any device that forms images by detecting light.

Figure 11:
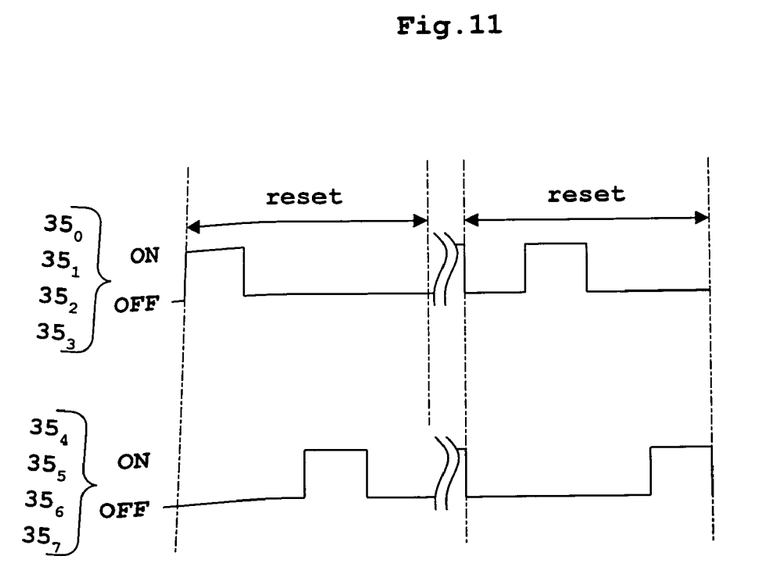
FIG. 11 is a timing chart showing a modified operating sequence for driving control of the gate lines.

(5) In the embodiment described above, the reading operation is controlled to turn on one gate line 35 after another, and the reset operation is carried out not to turn on adjacent gate lines 35 simultaneously. A different reading mode (hereinafter called "simultaneous reading mode") may be adopted in which, assuming that n is an integer 2 or more, n lines adjoining one another form a line group. In the reading operation, a driving signal is applied to each line group (to turn on one line group after another as in the foregoing embodiment) to read carriers for each line group. As shown in FIG. 11, for example, four adjacent gate lines 35 ($35_0$, $35_1$, $35_2$ and $35_3$) may form a line group, a subsequent four gate lines 35 ($35_4$, $35_5$, $35_6$ and $35_7$) also form a line group. The remaining gate lines, four each, similarly form line groups for reading carriers. In the reset operation, the driving signal is not applied simultaneously to adjacent line groups. In FIG. 11, while the four gate lines 35 ($35_0$, $35_1$, $35_2$ and $35_3$) are turned on, the four gate lines 35 ($35_4$, $35_5$, $35_6$ and $35_7$) are turned off. Conversely, while the four gate lines 35 ($35_4$, $35_5$, $35_6$ and $35_7$) are turned on, the four gate lines 35 ($35_0$, $35_1$, $35_2$ and $35_3$) are turned off. This simultaneous reading mode also can prevent offset errors that would produce artifacts in stripe form appearing on an image.

(6) In the embodiment shown in FIG. 8, the reset operation is carried out before and after the reading operation. In the embodiments shown in FIGS. 9A and 9B, the reset operation is carried out before or after the reading operation. The invention is not limited to a particular control mode for the reading and reset operations. The control mode will serve the purpose as long as each frame cycle includes at least one reading operation and at least one reset operation.

(7) In the embodiment described above, the gate lines 35 are divided into odd-numbered and even-numbered lines, so that adjacent gate lines 45 are not turned on during the reset operation. Thus, while one set of lines is turned on simultaneously, the other set of lines is turned off.

Figure 12:
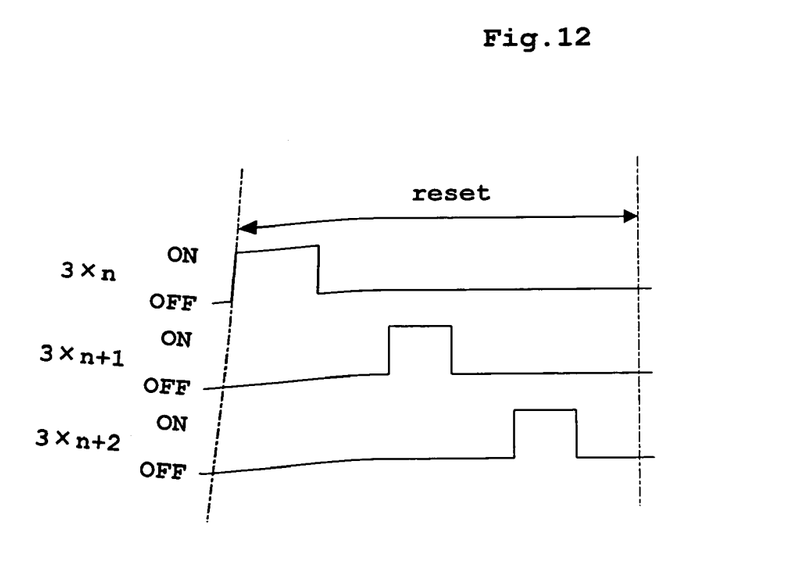
FIG. 12 is a timing chart showing a further modified operating sequence for drive control of the gate lines.

Instead, the gate lines 35 may be divided into three or more sets. As shown in FIG. 12, for example, where n is a natural number, the gate lines may be divided into sets of (3×n), (3×n+1) and (3×n+2), and while one of these sets of gate lines 35 is turned on simultaneously, the remaining two or more sets of gate lines 35 are turned off. Further, in combination with modification (5), the plurality of line groups may be divided into three or more sets. In this case, while one of these sets of line groups is turned on simultaneously, the remaining sets of line groups are turned off.

(8) In the embodiment described above, to drive the FPD 3 by applying a driving signal to each gate line 35, the driving signal ($V_{GON}$) with a voltage $V_{GON}$ corresponding to a gate voltage in ON state is applied to and turns on each gate line 35. The invention is not limited to such a driving signal. For example, a driving signal ($V_{GOFF}$) with a voltage $V_{GOFF}$ corresponding to a gate voltage in OFF state may be applied to each gate line 35 to drive the FPD 3.

(9) In the embodiment described above, the reset operation is controlled to reset the amplifier array circuit 37 which is a typical example of amplifying device. It is not absolutely necessary to reset the amplifying device in the reset operation. Although the changeover switches $S_{CSA}$ and $S_{MA}$ of the amplifier array circuit 37 are turned off in the reset operation, only one of the changeover switches $S_{CSA}$ and $S_{MA}$ may be turned off. Further, the amplifying device, typically the amplifier array circuit 37 may be reset by a method other than turning off of the changeover switches.

(10) In the foregoing embodiment, a partial reading mode has been described by way of example. The invention is not limited to the partial reading mode for reading the in-field $P_{IN}$ shown in FIG. 7, but is applicable also to an ordinary reading mode for reading the total field P. The invention is further applicable to a control for switching between the partial reading mode and ordinary reading mode for each successive frame.

(11) In the embodiment described above, the driving signal is not applied simultaneously to adjacent lines in the reset operation. It is not absolutely necessary not to apply the driving signal simultaneously to adjacent lines. The driving signal may be applied simultaneously to adjacent lines in the reset operation unless this causes offset errors that would produce artifacts in stripe form appearing on an image, or where there is not need to consider artifacts in stripe form.

(12) In the embodiment described above, the FPD controller 5 is included in the image sensor S. Instead, the FPD controller 5 may be disposed outside the image sensor S.

This invention may be embodied in other specific forms without departing from the spirit or essential attributes thereof and, accordingly, reference should be made to the appended claims, rather than to the foregoing specification, as indicating the scope of the invention.

What is claimed is:

1. An image sensor for obtaining images, comprising:
a light or radiation detector for detecting light or radiation by converting light or radiation information to charge information in response to incident light or radiation, and reading the charge information;
a control device for controlling said detector to perform a reading operation for reading the charge information and a reset operation for resetting and discarding the charge information, during a frame cycle from a reading point of time for reading charge information collectively from a predetermined read area to a reading point of time for reading charge information collectively from a next predetermined read area; and
a driving device for driving said detector by applying a driving signal to each line;
wherein said control device performs controls to drive said detector in said reading operation by applying the driving signal to each line to read said charge information for said each line, and in said reset operation not to apply the driving signal simultaneously to adjacent lines; and
wherein said lines are divided into a first set and a second set of alternate lines, said reset operation being carried out such that, while the driving signal is applied simultaneously to the first set of alternate lines, the driving signal is not applied to the second set of alternate lines, and that, while the driving signal is applied simultaneously to the second set of alternate lines, the driving signal is not applied to the first set of alternate lines.

2. An image sensor as defined in claim 1, further comprising:
an amplifying device for amplifying said charge information;
wherein said control device performs controls to reset said amplifying device in said reset operation.

3. An image sensor as defined in claim 1, wherein, in a partial reading mode for selectively reading said charge information from said predetermined read area limited to a part of an image field, said reading operation is performed for said read area limited, and said reset operation is performed for an out-field other than said read area limited.

4. An image sensor as defined in claim 1, wherein, in a reading mode for reading said charge information from said predetermined read area corresponding to a total image field, said reading operation and said reset operation are performed for said total image field.

5. An image sensor as defined in claim 1, further comprising:
charge-transferring transistors; and
gate lines connected to gates of said transistors;
wherein said driving signal has a voltage $V_{GON}$ corresponding to a gate voltage in ON state, and a driving signal $V_{GON}$ is applied to the gate lines to turn on the gate lines to drive the detector.

6. An image sensor as defined in claim 1, further comprising:
charge-transferring transistors; and
gate lines connected to gates of said transistors;
wherein said driving signal has a voltage $V_{GOFF}$ corresponding to a gate voltage in OFF state, and a driving signal $V_{GOFF}$ is applied to the gate lines to turn off the gate lines to drive the detector.

7. An imaging apparatus using an image sensor, the image sensor having a light or radiation detector for detecting light or radiation by converting light or radiation information to charge information in response to incident light or radiation, and reading the charge information, said apparatus comprising:
said image sensor;
an image processing device for performing image processing;
a control device for controlling said detector to perform a reading operation for reading the charge information and a reset operation for resetting and discarding the charge information, during a frame cycle from a reading point of time for reading charge information collectively from a predetermined read area to a reading point of time for reading charge information collectively from a next predetermined read area; and
a driving device for driving said detector by applying a driving signal to each line;
wherein said control device performs controls to drive said detector in said reading operation by applying the driving signal to each line to read said charge information for said each line, and in said reset operation not to apply the driving signal simultaneously to adjacent lines; and
wherein said lines are divided into a first set and a second set of alternate lines, said reset operation being carried out such that, while the driving signal is applied simultaneously to the first set of alternate lines, the driving signal is not applied to the second set of alternate lines, and that, while the driving signal is applied simultaneously to the second set of alternate lines, the driving signal is not applied to the first set of alternate lines.

8. An imaging apparatus as defined in claim 7, further comprising:
an amplifying device for amplifying said charge information;
wherein said control device performs controls to reset said amplifying device in said reset operation.

9. An imaging apparatus as defined in claim 7, wherein, in a partial reading mode for selectively reading said charge information from said predetermined read area limited to a part of an image field, said reading operation is performed for said read area limited, and said reset operation is performed for an out-field other than said read area limited.

10. An imaging apparatus as defined in claim 7, wherein, in a reading mode for reading said charge information from said predetermined read area corresponding to a total image field, said reading operation and said reset operation are performed for said total image field.

11. An imaging apparatus as defined in claim 7, further comprising:
charge-transferring transistors; and
gate lines connected to gates of said transistors;
wherein said driving signal has a voltage $V_{GON}$ corresponding to a gate voltage in ON state, and a driving signal $V_{GON}$ is applied to the gate lines to turn on the gate lines to drive the detector.

12. An imaging apparatus as defined in claim 7, further comprising:
charge-transferring transistors; and
gate lines connected to gates of said transistors;
wherein said driving signal has a voltage $V_{GOFF}$ corresponding to a gate voltage in OFF state, and a driving signal $V_{GOFF}$ is applied to the gate lines to turn off the gate lines to drive the detector.

13. An imaging apparatus as defined in claim 7, wherein said control device is disposed outside said image sensor.

14. An imaging apparatus as defined in claim 7, wherein said control device is disposed inside said image sensor.

* * * * *